H. VAN ALTENA.
Chromatrope Buzz Toy.

No. 208,351.                    Patented Sept. 24, 1878.

Attest:
F. B. Broek.
D. G. Stuart

Inventor:
Henry Van Altena
by A. McCallum
Attorney.

UNITED STATES PATENT OFFICE.

HENRY VAN ALTENA, OF MILWAUKEE, WISCONSIN.

IMPROVEMENT IN CHROMATROPE BUZZ-TOYS.

Specification forming part of Letters Patent No. 208,351, dated September 24, 1878; application filed May 8, 1878.

*To all whom it may concern:*

Be it known that I, HENRY VAN ALTENA, of the city of Milwaukee, in the county of Milwaukee and State of Wisconsin, have invented certain new and useful Improvements in Chromatrope Buzz-Toys; and I do hereby declare that the following is a full, clear, and exact description thereof, which will enable others skilled in the art to which it appertains to make and use the same, reference being had to the accompanying drawing, and to letters of reference marked thereon, which form a part of this specification.

Figure 1:
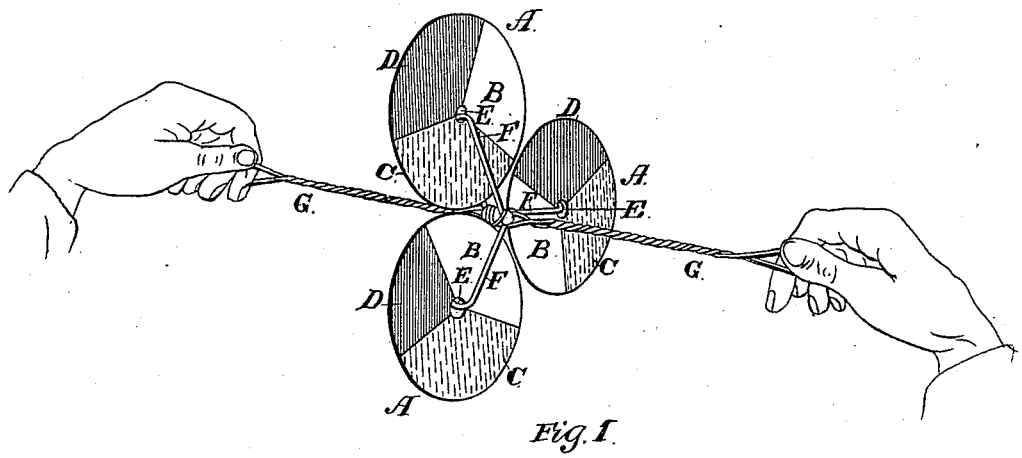
Figure 2:
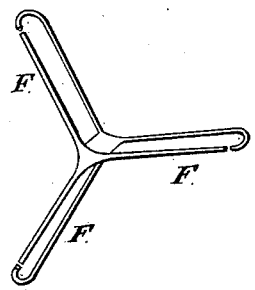
Figure 3:
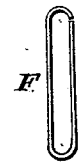

Figure 1 of the accompanying drawing represents a perspective view of my invention. Fig. 2 is a perspective view of the arms with disks and cord removed. Fig. 3 is a side view of a single arm as made before being secured together.

The object of my invention is to furnish improvements in chromatrope buzz-toys, which, when operated, will present a great variety of beautiful appearances, which result is attained by combining several disks upon which a few of the prime colors are arranged, so that, as the disks are revolved around a common center, they each turn automatically upon their own centers, and thus change their relative positions to each other, and by means of which change the said prime colors are blended together, and a great variety of colors are thereby produced.

In the accompanying drawing, A represents the disks, which are colored upon both sides. They are constructed of card-board, tin, or other thin material. B, C, and D represent the arrangement of the several colors upon the disks, which arrangement may be changed to suit the taste. E are eyelets at the center of the disks. F are arms for holding and revolving the disks A. They may each be constructed of one piece of wire, which is first bent in the shape shown in Fig. 3, when they are arranged as shown in Fig. 2, and secured in that position with a drop of solder, by which they are firmly attached together in the position shown, when their outer ends are slightly sprung apart and the disks are slipped upon them, as shown in Fig. 1. G are the cords by which the buzz is operated.

Having thus described my invention, what I claim as new, and desire to secure by Letters Patent, is—

1. In a buzz-toy, the arms F, secured together and arranged to radiate from a common center, around which they revolve, substantially as and for the purpose specified.

2. The combination of the disks A with the arms F, constructed and arranged to operate substantially as and for the purpose specified.

3. The combination of the arms F, arranged to radiate from a common center, with the disk A and cords G, all substantially as and for the purpose specified.

In testimony that I claim the foregoing as my own I affix my signature in presence of two witnesses.

HENRY VAN ALTENA.

Witnesses:
   JAS. B. ERWIN,
   CHARLES BEYER.